Patented June 8, 1948

2,442,892

UNITED STATES PATENT OFFICE 2,442,892

WELDING FLUXES

George W. Harvey, San Diego, Calif., assignor to Solar Aircraft Company, San Diego, Calif., a corporation of California No Drawing. Application May 1, 1943, Serial No. 485,333

6 Claims. (Cl. 148—23)

This invention relates to fluxes for welding, brazing and the like, and particularly to fluxes for use in welding rich ferrous alloys having high heat and corrosion characteristics, such as the stainless steels. It is further restricted to use in flame and arc welding in which the flux is kept out of the flame or arc, as distinct from arc welding in which the flux constitutes a coating on the electrode rod and as distinct from flame welding in which the flux is mixed with the torch gases.

The invention is particularly useful for welding thin sheets, where the flux is applied to the back side of the sheet to prevent corrosion of the highly heated alloy by the atmosphere. It is common practice to apply such fluxes as a paint to the rear surface of the sheet along the line of the weld some time before the welding is started, and the flux may or may not be dry when the welding is started. Regardless of the practice in this respect, a defect of prior fluxes known to me is that they could not be made to stay in place without introducing objectionable ingredients, and they gave incomplete protection against the atmosphere, resulting in frequent burning of the sheet. More specifically, these fluxes, when mixed with water, flaked off the sheet while drying or during initial application of the welding heat. It was found possible to make them adhere by mixing them with shellac, but shellac causes carbon absorption into chromium-nickel stainless steels during welding, resulting in brittle welds that are unsafe when exposed to high temperatures and corrosive conditions in service. I have also found that some of the fluxes heretofore used in welding rich ferrous alloys introduce boron into the alloys, making them hazardously brittle.

It is a general object of the present invention to overcome the aforementioned defects of prior fluxes and to provide a flux that has good adhering properties during the drying and initial heating stages, that affords good protection against the atmosphere during the welding operation, and that does not introduce deleterious elements into the weld.

Additional objects are to produce a flux that leaves a readily removable residue and is inexpensive.

Other more specific objects and features of the invention will appear from the detailed description to follow of certain preferred embodiments thereof.

The simplest flux, in accordance with the invention, consists of a mixture of titanium dioxide and a silicate of sodium, potassium, calcium, or barium. More than one silicate may be employed to advantage and a suitable formula is, by weight:

| | Per cent |
|---|---|
| Titanium dioxide | 15 |
| Sodium silicate | 15 |
| Calcium silicate | 70 |

In general, the titanium dioxide content should be between 10% and 15% but may go as high as 20%. The flux can be mixed with any liquid, including water, to make a paint of suitable consistency for application to the work to be welded. This flux has the new property of providing superior protection for the heated alloy against the atmosphere. The superiority of the present flux is due to the combination with the silicates of the titanium dioxide, which gives unequaled protection to the weld metal from the atmosphere despite wide variations in the thickness of the flux, amount of heat, or time of exposure. Whereas, many fluxes contain constituents for dissolving oxides from a weld, the present flux containing titanium dioxide and silicates appears to function to prevent the formation of oxides by providing a superior film for protecting the hot alloy from contact with the atmosphere. The thorough protection afforded by the flux enables the use of higher temperatures in the weld, which has the beneficial effect of floating out impurities such as oxides if they are present.

The titanium dioxide also has the desirable property of improving the consistency of the flux when mixed with liquid for use.

The flux described may be improved by adding boron oxide ($B_2O_3$) to the dry flux and by mixing it with methanol as the vehicle. A suitable formula, by weight of anhydrous materials, is:

| | Per cent |
|---|---|
| Titanium dioxide | 12 |
| Calcium silicate | 76 |
| Boron oxide | 12 |

Although the particular formula given appears to be most satisfactory, considerable departure from the exact proportions specified can be had while still obtaining the advantages of the ingredients. In general, the titanium dioxide may vary from 10% to 20%, the total silicate content may vary from about 80% to 40% and the boron oxide content may vary from about 6% to 18%.

The addition of the boron oxide and the use of methanol as the vehicle enormously improves the adherence of the flux during drying and heating without adding any objectionable features. It has been mentioned that some prior fluxes containing boron were objectionable because they introduced boron into the alloy, causing brittleness. The present flux does not have this defect to any serious extent because of the small percentage of the boron employed, which may vary from about 1½% to 6%.

I believe it to be new to employ boron oxide and methanol to produce adherence of a flux containing titanium dioxide and silicates, although they have been employed in other fluxes for other purposes, namely, to increase viscosity and to dissolve metal oxides. The use of boron oxide and methanol has the further advantage that it eliminates the necessity of using water as a vehicle, and water is to be avoided in fluxes for welding stainless steels because it is given off during the welding and produces corrosion by hydrolysis. It is to be understood that in my fluxes using boron oxide and methanol the ingredients should be anhydrous. Ethyl alcohol (ethanol) may be employed instead of methanol, but the latter seems to be the most satisfactory. It is desirable to keep the water content low, and the water content of the alcohol should be kept below 3%.

The boron oxide reacts with the methanol to produce methyl borate, which itself is a clear watery liquid and mixes with the excess of methanol present. The remaining ingredients are substantially insoluble in the liquids and are held in suspension. After application to the work, the solution evaporates, but it is believed some of the methyl borate decomposes to form some finely divided boron oxide that acts as a binder for the other flux ingredients. The evaporation of a portion at least of the methyl borate reduces the boron left in the flux at the time of welding, and hence reduces the tendency for boron contamination of the welded alloys. However, the residue left by the methyl borate binds together the very fine, almost colloidal, particles of calcium silicate and titanium dioxide into a closely adhering coating having considerable strength.

Both of the formulas so far discussed can be improved by the addition of a small amount of a fluoride. Lithium fluoride is preferred because it seems to be most effective in aiding in forming a thin film capable of protecting the weld metal from the atmosphere and in preventing the formation of volatile fluorides, but it is relatively expensive and for this reason I preferably employ a mixture of calcium and lithium fluorides. The calcium fluoride may constitute from about 3% to 25% and the lithium fluoride from about 1% to 3% of the total flux. Their usefulness is that they aid in forming a thin film impervious to atmospheric oxygen, dissolve oxides, and reduce the surface tension of the molten alloy at the weld. The lithium fluoride and titanium dioxide together seem to be particularly effective in maintaing a thin protective film capable of preventing burning of the weld.

It is also desirable to include in the flux some borax glass ($Na_2B_4O_7$) to lower the melting point and give a better melting range. The borax glass and the boron oxide function together to start the melting. The borax glass content should be between 4% and 15% of the total flux. It is desirable to keep it as low as is consistent with obtaining of the desired melting range, to reduce the chance of contaminating the work. Generally, the total content of boron compounds should be kept below about 18% to prevent the boron from alloying with the work.

A successful formula incorporating all the discussed ingredients is:

| | Per cent by weight |
|---|---|
| Boron oxide | 10.8 |
| Calcium silicate | 43.5 |
| Calcium fluoride | 21.7 |
| Lithium fluoride | 2.0 |
| Borax glass | 7.0 |
| Titanium dioxide | 14.5 |

All ingredients should be anhydrous and ground to size as follows: boron oxide 100 max., 150 min. on Tyler standard screen; titanium dioxide 300 max. on Tyler standard screen; all others 200 max. on Tyler standard screen.

It is necessary that the particle size be approximately correct and that the flux be thoroughly mixed before the methanol is added to it. Otherwise, the heating resulting from the reaction may boil off some of the methyl borate. In preparing the flux for use it is mixed with sufficient methanol to form a creamy paint, which may be applied to the sheets to be welded with a brush or by any other convenient method.

It is sometimes desirable to add some silicon dioxide (quartz sand) to the flux to lower its melting range and increase its viscosity at high temperatures. A suitable formula containing quartz sand is:

| | Per cent by weight |
|---|---|
| Boron oxide | 8 |
| Calcium silicate | 40.5 |
| Calcium fluoride | 8.0 |
| Lithium fluoride | 1.5 |
| Borax glass | 5.0 |
| Titanium dioxide | 12.0 |
| Quartz sand | 25.0 |

Obviously departures from the above formula can be made without destroying the desirable properties of the flux, the limits that are considered to come within the present invention being specified in the claims. The flux can contain silicon dioxide in varying amounts but, in general, no advantage results from additions thereof exceeding 30%.

The flux can be applied to work pieces as long as eight hours in advance of welding and when dry will adhere to the work-piece up to and during the time of welding under reasonable conditions of handling.

The flux greatly increases the quality of welds produced by inexperienced and student welders, and all welds produced with it have better mechanical properties than welds made with other fluxes known to me.

It has been stated that the flux is intended for use as a coating on rich ferrous alloys, and this expression is intended to mean ferrous alloys in which the amount of at least one addition metal exceeds 5%.

Obviously, departures can be made from the foregoing formulas without departing from the invention, and it is therefore to be limited only to the extent set forth in the appended claims.

I claim:

1. A fluxing paint for coating rich ferrous alloys prior to welding them, said paint comprising a vehicle consisting of an alcohol of the group consisting of methanol and ethanol, said alcohol having a water content less than 3%, and a powdered pigment comprising as its essential ingredients in anhydrous form an unreacted mechanical mixture of titanium dioxide, boron oxide, calcium fluoride, lithium fluoride and borax glass, in which the approximate proportions by weight of the ingredients in the pigment are titanium dioxide 14.5%, boron oxide 10.8%, calcium silicate 43.5%, calcium fluoride 21.7%, lithium fluoride 2%, and borax glass 7%.

2. A fluxing paint for coating rich ferrous alloys prior to welding them, said paint comprising a vehicle consisting of an alcohol of the group consisting of methanol and ethanol, said alcohol having a water content less than 3%, and a powdered pigment comprising as its essential ingredients in anhydrous form an unreacted mechanical mixture of titanium dioxide, boron oxide, calcium fluoride, lithium fluoride, borax glass and quartz sand in which the approximate proportions by weight of the ingredients in the pigment are titanium dioxide 12%, boron oxide 8%, calcium silicate 40.5%, calcium fluoride 8%, lithium fluoride 1.5%, borax glass 5%, and quartz sand 25%.

3. A fluxing powder to be mixed with an alcohol of the group consisting of methanol and ethanol to form a fluxing paint for coating rich ferrous alloys, prior to welding them, on the side opposite to that on which the welding operation is performed, said powder consisting of an unreacted mechanical mixture of powdered ingredients and comprising as its essential ingredients in anhydrous form titanium dioxide, calcium silicate, calcium fluoride, lithium fluoride, boron oxide, and borax glass, in which the approximate proportions by weight are titanium dioxide 14.5%, calcium silicate 43.5%, calcium fluoride 21.7%, lithium fluoride 2.0%, boron oxide 10.8%, and borax glass 7%, said fluxing paint being characterized by its ability to stick to the alloy after drying and while being heated to fusion and to thereafter form and maintain a film on the heated alloy that will protect it from corrosion by the atmosphere.

4. A fluxing powder to be mixed with an alcohol of the group consisting of methanol and ethanol to form a fluxing paint for coating rich ferrous alloys, prior to welding them, on the side opposite to that on which the welding operation is performed, said powder consisting of an unreacted mechanical mixture of powdered ingredients and comprising as its essential ingredients in anhydrous form titanium dioxide, calcium silicate, calcium fluoride, lithium fluoride, boron oxide, borax glass, and quartz sand, in which the approximate proportions by weight are titanium dioxide 12%, calcium silicate 40.5%, calcium fluoride 8.0%, lithium fluoride 1.5%, borax glass 5.0%, boron oxide 8.0%, and quartz sand 25.0%, said fluxing paint being characterized by its ability to stick to the alloy after drying and while being heated to fusion and to thereafter form and maintain a film on the heated alloy that will protect it from corrosion by the atmosphere.

5. A fluxing paint for coating rich ferrous alloys prior to welding them, said paint comprising a vehicle consisting of an alcohol of the group consisting of methanol and ethanol, said alcohol having a water content less than 3%, and a powdered pigment comprising as its essential ingredients in anhydrous form an unreacted mechanical mixture of titanium dioxide, boron oxide, and a silicate of a metal of the group consisting of sodium, potassium, calcium, and barium, said fluxing paint being characterized by its ability to stick to the alloy after drying and while being heated to fusion and to thereafter form and maintain a film on the heated alloy that will protect it from corrosion by the atmosphere.

6. A fluxing powder to be mixed with an alcohol of the group consisting of methanol and ethanol to form a fluxing paint for coating rich ferrous alloys prior to welding them, on the side opposite to that on which the welding operation is performed, said powder consisting of an unreacted mechanical mixture of powdered ingredients and comprising as its essential ingredients in anhydrous form titanium dioxide, boron oxide, and a silicate of a metal of the group consisting of sodium, potassium, calcium, and barium, in which the proportions of the constituents by weight are titanium dioxide from 10% to 20%, boron oxide from 6% to 18%, and silicates from 80% to 40%, said fluxing paint being characterized by its ability to stick to the alloy after drying and while being heated to fusion and to thereafter form and maintain a film on the heated alloy that will protect it from corrosion by the atmosphere.

GEORGE W. HARVEY.

REFERENCES CITED

The following references are of record in the file of this patent:

UNITED STATES PATENTS

| Number | Name | Date |
| --- | --- | --- |
| 760,783 | Ellis | May 24, 1904 |
| 940,111 | Ackermann | Nov. 16, 1909 |
| 1,675,664 | Reuss | July 3, 1928 |
| 1,748,785 | Miller | Feb. 25, 1930 |
| 2,010,776 | Frost | Aug. 6, 1935 |
| 2,043,960 | Jones et al. | June 9, 1936 |
| 2,053,408 | Pfanstiehl | Sept. 8, 1936 |
| 2,088,935 | Vaughn | Aug. 3, 1937 |
| 2,090,618 | Bley | Aug. 24, 1941 |
| 2,191,473 | Blumberg | Feb. 27, 1940 |
| 2,249,007 | Kinsie et al. | July 15, 1941 |
| 2,269,167 | Somerville | Jan. 6, 1942 |
| 2,294,439 | Bagley | Sept. 1, 1942 |